United States Patent
Chang et al.

(10) Patent No.: US 9,449,391 B2
(45) Date of Patent: Sep. 20, 2016

(54) ELECTRONIC DEVICE AND METHOD OF TRANSFORMING INTO BOOKSHELF THEREOF

(71) Applicant: Wistron Corporation, New Taipei (TW)

(72) Inventors: Ya-Hsin Chang, New Taipei (TW); Chia-Liang Lai, New Taipei (TW)

(73) Assignee: WISTRON CORPORATION, New Taipei (TW)

( * ) Notice: Subject to any disclaimer, the term of this patent is extended or adjusted under 35 U.S.C. 154(b) by 0 days.

(21) Appl. No.: 14/747,053

(22) Filed: Jun. 23, 2015

(65) Prior Publication Data
US 2016/0217579 A1   Jul. 28, 2016

(30) Foreign Application Priority Data

Jan. 23, 2015   (TW) .............................. 104102326 A

(51) Int. Cl.
| | | |
|---|---|---|
| *G06K 9/00* | (2006.01) | |
| *G06T 7/00* | (2006.01) | |
| *G06F 3/02* | (2006.01) | |

(52) U.S. Cl.
CPC ........... *G06T 7/0042* (2013.01); *G06F 3/0202* (2013.01); *G06K 9/00604* (2013.01); *G06T 7/0065* (2013.01); *G06T 2207/10028* (2013.01); *G06T 2207/30201* (2013.01)

(58) Field of Classification Search
CPC .............. G06T 7/0042; G06T 7/0065; G06T 2207/10028; G06T 2207/30201; G06F 3/0202; G06K 9/00604
See application file for complete search history.

(56) References Cited

U.S. PATENT DOCUMENTS

| | | | | |
|---|---|---|---|---|
| 5,682,173 | A * | 10/1997 | Holakovszky | G02B 27/0172 345/8 |
| 8,199,185 | B2 * | 6/2012 | McNelley | G02B 27/2292 348/14.16 |
| 2011/0007496 | A1 * | 1/2011 | Chien | F21S 4/28 362/157 |
| 2013/0009878 | A1 | 1/2013 | Wu | |

FOREIGN PATENT DOCUMENTS

| | | |
|---|---|---|
| TW | M368282 | 11/2009 |
| TW | 201318581 A1 | 5/2013 |

OTHER PUBLICATIONS

TIPO Office Action dated Mar. 1, 2016 in corresponding Taiwan application (No. 104102326).
English translation of TIPO Office Action dated Mar. 1, 2016 in corresponding Taiwan application (No. 104102326).

* cited by examiner

*Primary Examiner* — Shefali Goradia
(74) *Attorney, Agent, or Firm* — McClure, Qualey & Rodack, LLP

(57) ABSTRACT

The electronic device includes a main body, a display screen, a first block plate, a first image capturing unit, a second image capturing unit, an image analysis unit and a control unit. The first image capturing unit is used for capturing a book image of the book and a first eye image of an eye. The second image capturing unit is used capturing a second eye image of the eye. The image analysis unit is used for determining a relative distance between the eye and the main body according to the first eye image and the second eye image and a book size of the book according to the book image. The control unit is used for determining a suitable viewing angle and controlling the display screen to rotate, such that a viewing angle at the book viewed by the eye is substantially equal to the suitable viewing angle.

18 Claims, 9 Drawing Sheets

ELECTRONIC DEVICE AND METHOD OF TRANSFORMING INTO BOOKSHELF THEREOF

This application claims the benefit of Taiwan application Serial No. 104102326, filed Jan. 23, 2015, the subject matter of which is incorporated herein by reference.

BACKGROUND OF THE INVENTION

1. Field of the Invention

The invention relates in general to an electronic device and a method of transforming into a bookshelf thereof, and more particularly to an electronic device using an image analysis technique and a method of transforming into a bookshelf thereof.

2. Description of the Related Art

In general, reader flatwise places a book on a desk when reading the book. Reader usually holds the book by hands and keeps the book standing. However, such way will result in inconvenience.

SUMMARY OF THE INVENTION

The invention is directed to an electronic device and a method of transforming into a bookshelf thereof, wherein the electronic device may provide a bookshelf function and makes reader reads the book at a suitable viewing angle.

According to one embodiment of the present invention, an electronic device is provided. The electronic device includes a main body, a display screen, a first block plate, a first image capturing unit, a second image capturing unit, an image analysis unit and a control unit. The display screen is pivotally connected to the main body. The first block plate is pivotally connected to the main body for making a book lean against between the first block plate and the display screen. The first image capturing unit is disposed on the display screen for capturing a book image of the book and a first eye image of an eye. The second image capturing unit is disposed on the main body for capturing a second eye image of the eye. The image analysis unit is used for determining a relative distance between the eye and the main body according to the first eye image and the second eye image and a book size of the book according to the book image. The control unit is used for determining a suitable viewing angle according to the relative distance and the book size and controlling the display screen to rotate, such that a viewing angle at the book viewed by the eye is substantially equal to the suitable viewing angle.

According to another embodiment of the present invention, a method of an electronic device being transformed into a bookshelf is provided. The method includes the following steps. An electronic device is provided, wherein the electronic device a main body, a display screen, a first block plate, a first image capturing unit, a second image capturing unit, an image analysis unit and a control unit; the first image capturing unit captures a book image of a book and a first eye image of an eye; the second image capturing unit captures a second eye image of the eye; the image analysis unit determines a relative distance between the eye and the electronic device according to the first eye image and the second eye image; the image analysis unit determines a book size of the book according to the book image; the control unit determines a suitable viewing angle according to the relative distance and the book size; and the control unit controls the display screen to rotate, such that a viewing angle at the book viewed by the eye is substantially equal to the suitable viewing angle.

The above and other aspects of the invention will become better understood with regard to the following detailed description of the preferred but non-limiting embodiment(s). The following description is made with reference to the accompanying drawings.

DETAILED DESCRIPTION OF THE INVENTION

Figure 1:
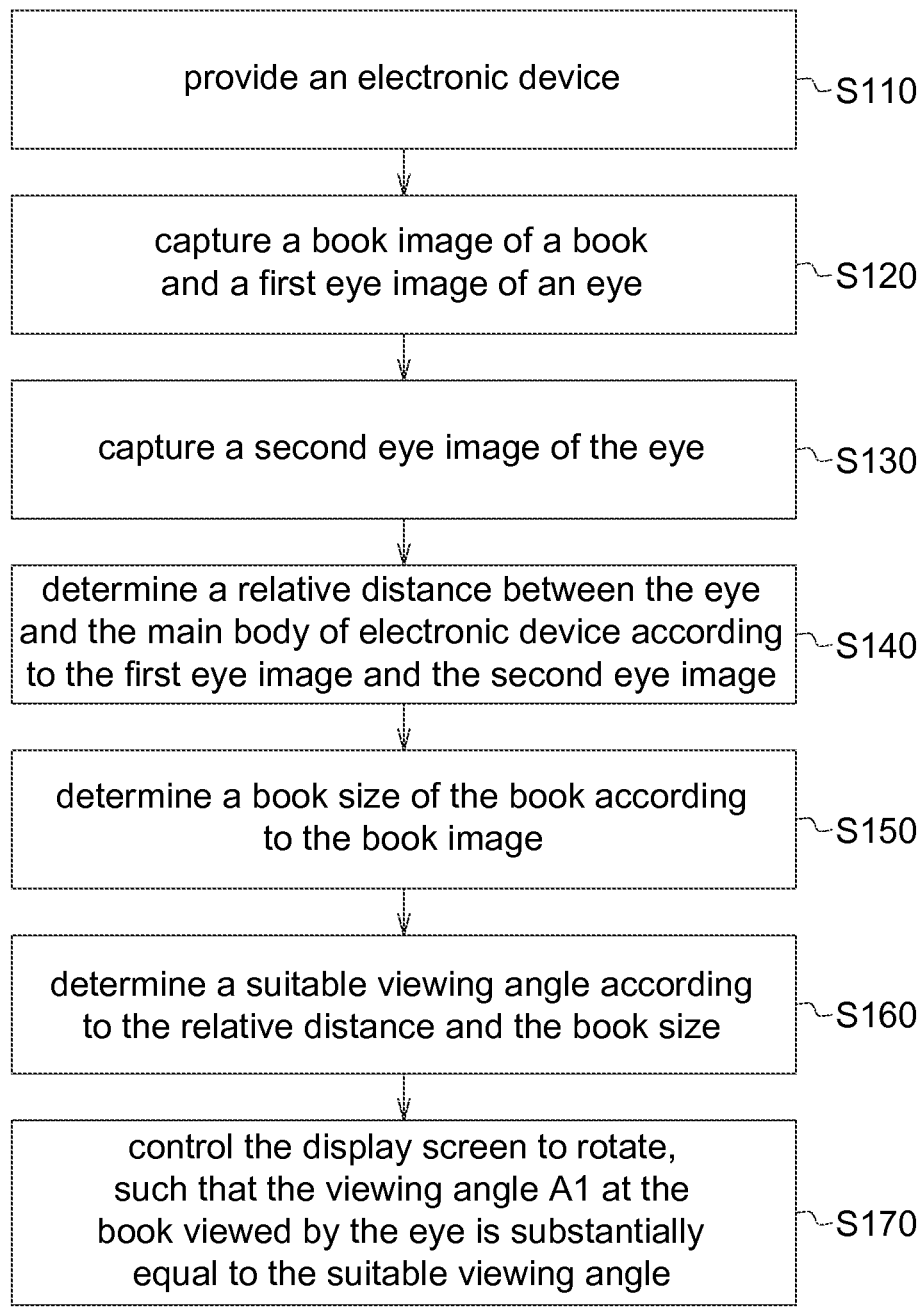
FIG. 1 is a flow chart of the electronic device being transformed into a bookshelf according to an embodiment of the disclosure.

FIG. 1 is a flow chart of the electronic device being transformed into a bookshelf according to an embodiment of the disclosure.

Figure 2:
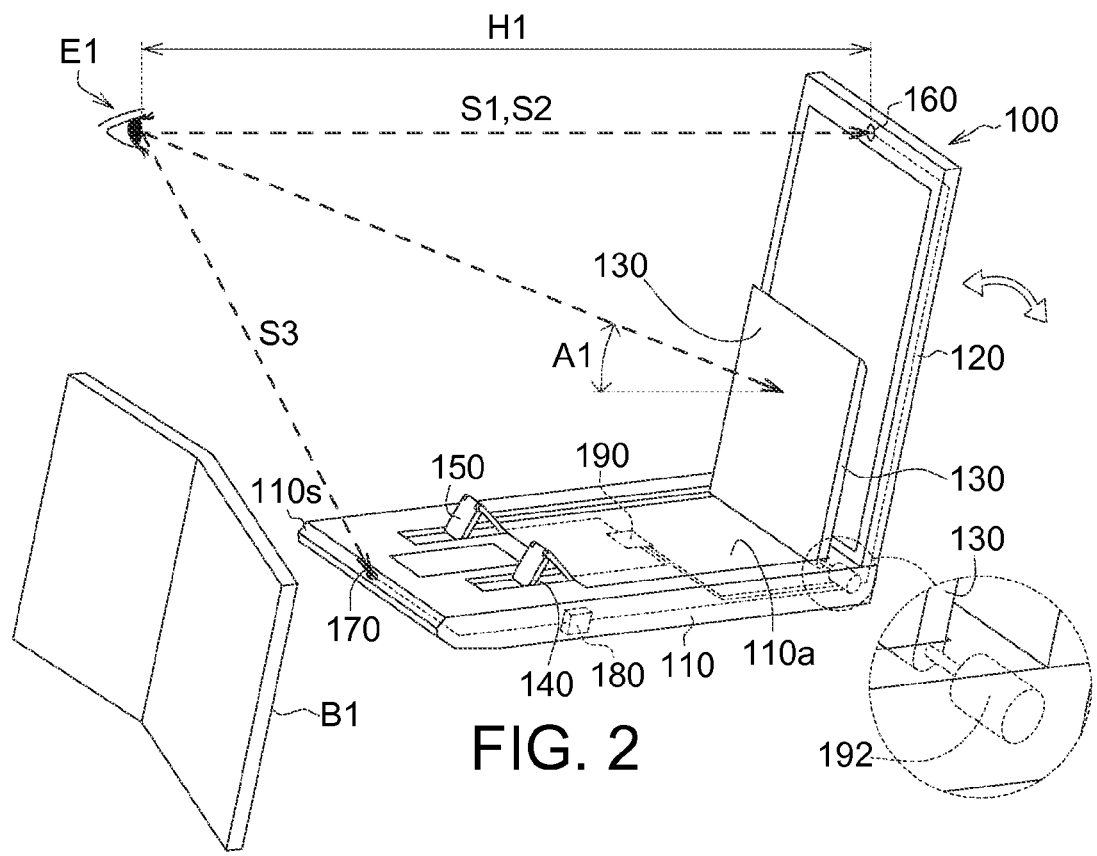
FIG. 2 is an appearance of the electronic device according to an embodiment of the disclosure.

In step S110, as shown in FIG. 2, FIG. 2 is an appearance of the electronic device according to an embodiment of the disclosure. The electronic device 100 is, for example, a notebook or other type of the electronic device having two modules capable of being pivotally connected to each other.

The electronic device 100 includes a main body 110, a display screen 120, a keyboard 130, a first block plate 140, a second block plate 150, a first image capturing unit 160, a second image capturing unit 170, an image analysis unit 180 and a control unit 190. The display screen 120 is pivotally connected to the main body 110, such that the display screen 120 may rotate with respect to the main body 110. The keyboard 130 is pivotally connected to the main body 110, such that the keyboard 130 may rotate with respect to the main body 110. The first image capturing unit 160 is disposed on the display screen 120, and the second image capturing unit 170 is disposed on the main body 110. The first block plate 140 and the second block plate 150 are pivotally connected to the main body 110, such that the first block plate 140 and the second block plate 150 may rotate with respect to the main body 110.

In step S120, the first image capturing unit 160 may capture a book image S1 of a book B1 (as shown in FIG. 2). For example, the book B1 may be placed in front of the first image capturing unit 160 for making the first image capturing unit 160 capture the book image S1. In addition, the first image capturing unit 160 further captures a first eye image S2 of an eye E1.

In step S130, as shown in FIG. 2, the second image capturing unit 170 may capture a second eye image S3 of the eye E1. The main body 110 has a slantwise surface 110s, and the second image capturing unit 170 is disposed on the slantwise surface 110s for capturing the second eye image S3 of the eye E1.

In step S140, the image analysis unit 180 may determine a relative distance H1 between the eye E1 and the main body 110 of electronic device 100 according to the first eye image S2 and the second eye image S3.

In step S150, the image analysis unit 180 may determine a book size of the book B1 according to the book image S1.

In step S160, the control unit 190 determines a suitable viewing angle according to the relative distance H1 and the book size. For example, the control unit 190 may store a relationship between the relative distance H1, the book size and the suitable viewing angle. The control unit 190 may inquire or calculate the corresponding viewing angle according to the relative distance H1 and the book size. For example, when the relative distance H1 ranges between 65 centimeters and 70 centimeters, and the suitable viewing angle at the book B1 may range between 15 degrees and 20 degrees. Alternatively, when the relative distance H1 ranges between 60 centimeters and 70 centimeters, and the suitable viewing angle at the book B1 may range between 10 degrees and 20 degrees. In another embodiment, when the relative distance H1 may be less than 60 centimeters or larger than 70 centimeters, and the suitable viewing angle at the book B1 may range the corresponding scope of angle.

In step S170, the control unit 190 controls the display screen 120 to rotate, such that the viewing angle A1 (as shown in FIG. 2) at the book B1 viewed by the eye E1 is substantially equal to the suitable viewing angle. The control unit 190 may analyze the book size and accordingly obtain a center position of the book B1. The above-mentioned viewing angle A1 means an angle included between a connection line between the eye E1 and the center position of the book B1 disposed on the electronic device 100 and a parallel line.

Figure 3:
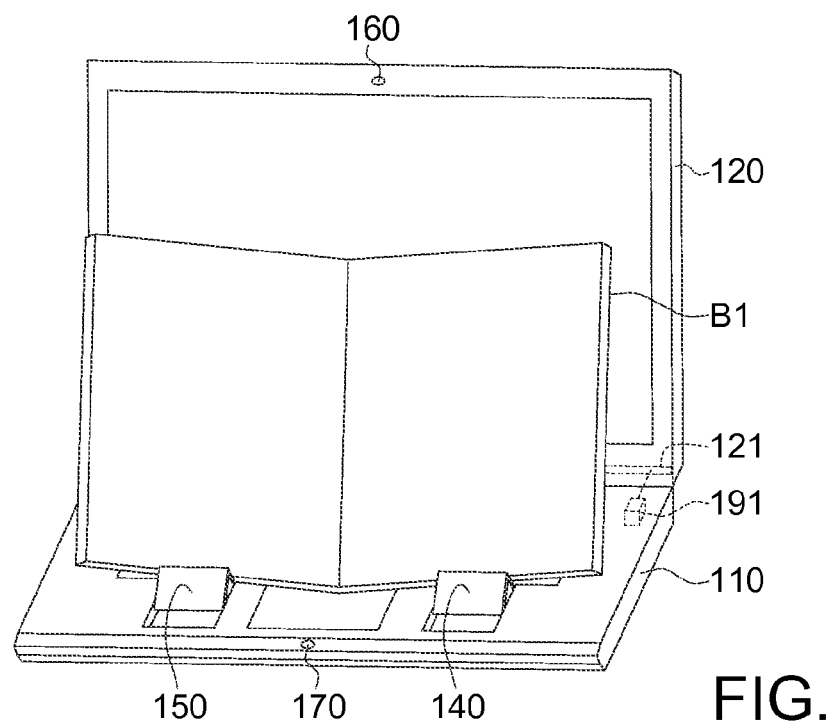
FIG. 3 is a diagram of the book disposed on the electronic device of FIG. 2.

FIG. 3 is a diagram of the book disposed on the electronic device of FIG. 2. In terms of control means, the electronic device 100 further includes a first driver 191 controlled by the control unit 190. The first driver 191 is connected to a rotating axis 121 of the display screen 120, and the control unit 190 may control the first driver 191 to rotate the rotating axis 121 of the display screen 120 for rotating the display screen 120.

In addition, as shown in FIG. 2, the electronic device 100 further a second driver 192 controlled by the control unit 190. The second driver 192 is connected to the keyboard 130. The control unit 190 may control the second driver 192 to rotate the keyboard 130 until the keyboard 130 is close to and does not lean against the display screen 120, or directly lean against the display screen 120. In addition, the main body 110 further includes an accommodating recess 110a for accommodating the keyboard 130. In an embodiment, the keyboard 130 has a thickness smaller than a depth of the accommodating recess 110a, such that when the keyboard is flatwise placed, the whole keyboard 130 may be accommodated within the accommodating recess 110a. As a result, after the display screen 120 covers the main body 110, the keyboard 130 may be prevented from being interfering with the display screen 120.

After the keyboard 130 opens, the book B1 may be located between the block portion (first block plate and the second plate) and the display screen 120. For example, as shown in FIG. 3, a bottom of the book B1 may lean against the first block plate 140 and the second block plate 150, and a rear of the book B1 may lean against the keyboard 130 (not shown in FIG. 3). Since the keyboard 130 is disposed between the display screen 120 and the book B1, a display surface of the display screen 120 may be prevented from being damaged or polluted by the book B1. In another embodiment, before the display screen 120 is rotated, the book B1 may be located between the block portion and the display screen 120, and then the display screen 120 may rotate to adjust an angle.

During reading the book B1, the first image capturing unit 160 and the second image capturing unit 170 may capture the first eye image S2 and the second eye image S3 of the eye E1 at any time or at regular time for determining whether the position of the eye E1 goes beyond the allowed scope. If the position of the eye E1 goes beyond the allowed scope, the control unit 190 may control the display screen 120 to rotate with respect to the main body 110 for making the viewing angle A1 at the book B1 viewed by the eye E1 comply with the suitable viewing angle. That is, the electronic device 100 of the present embodiment may adjust the angle according to posture of reader for usually making the reader read the book B1 at the suitable viewing angle.

Figure 4:
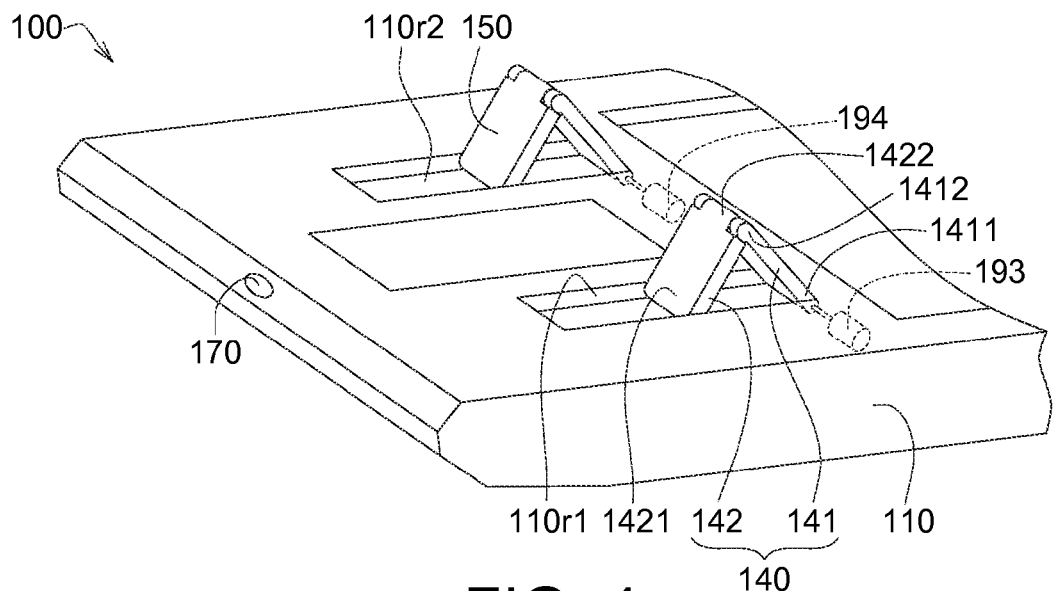
FIG. 4 is an enlargement diagram of the first block plate and the block plate of FIG. 2.

FIG. 4 is an enlargement diagram of the first block plate and the block plate of FIG. 2. The first block plate 140 includes a first plate 141 and a second plate 142. The first plate 141 includes a first end 1411 and a second end 1412, and the second plate 142 includes a first end 1421 and a second end 1422, wherein the first end 1411 of the first plate 141 is pivotally connected to the main body 110, the second end 1412 of the first plate 141 is pivotally connected to the second end 1422 of the second plate 142, and the first end 1421 of the second plate 142 is a free end.

The electronic device 100 further includes a third driver 193 controller by the control unit 190. The third driver 193 connects to the first end 1411 of the first plate 141 for driving the first plate 141 to rotate. When the first plate 141 rotates, the second plate 142 is driven to rotate, such that the first block plate 140 projects from the main body 110 for making the book B1 lean against the first block plate 140. In addition, the main body 110 has a first recess 110r1. The first recess 110r1 has a length longer than the total length of the first block plate 140, such that when the first plate 141 and the second plate 142 are at a flatwise placed situation, the whole first block plate 140 is located within the first recess 110r1. As a result, the first block plate 14 may be prevented from being interfered with the component outside the main body 110. For example, the display screen 120 may be prevented from difficultly covering the main body 110 or from being interfering with the display screen 120 when the display screen 120 covers the main body 110. In addition, the main body 110 further has a second recess 110r2. The relationship between the second block plate 150 and the second recess 110r2 is similar to that between the first block plate 140 and the first recess 110r1, and the similarities are not repeated here.

In another embodiment, the first end 1421 of the second plate 142 may be pivotally connected to the main body 110, and the first end 1411 of first plate 141 may be a free end. Under the design, the third driver 193 may connect to the first end 1421 of the second 142 for driving the second plate 142 to rotate.

In addition, the structure of the second block plate 150 is similar to that of the first block plate 140, and the similarities are not repeated here. The electronic device 100 further includes a fourth driver 194 controlled by the control unit 190. The fourth driver 194 connects to the second block plate 150. The connection of the fourth driver 194 and the second block plate 150 may be similar to that of the third driver 193 and the first block plate 140, and the similarities are not repeated here.

Figure 5:
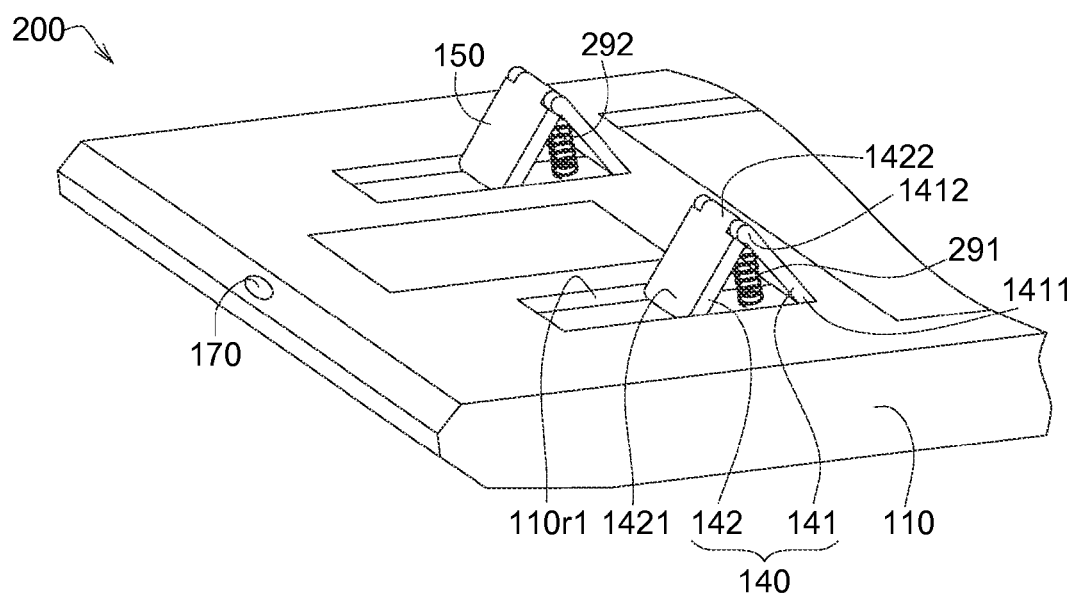
FIG. 5 is an enlargement diagram of a local portion of the electronic device according to another embodiment of the disclosure.

FIG. 5 is an enlargement diagram of a local portion of the electronic device according to another embodiment of the disclosure. The electronic device 200 includes the main body 110, the display screen 120 (not shown), the keyboard 130 (not shown), the first block plate 140, the second block plate 150, the first image capturing unit 160 (not shown), second image capturing unit 170, the image analysis unit 180 (not shown), the control unit 190 (not shown), the first driver 191 (not shown), the second driver 192 (not shown), a first elastic element 291 and a second elastic element 292.

The first elastic element 291 connects the main body 110 and the first block plate 140. For example, one end of the first elastic element 291 connects to the main body 110, and another end of the first elastic element 291 connects to one of the first plate 141 and the second plate 142 of the first block plate 140, or connects to a pivotal portion between the first plate 141 and the second plate 142. When the first block plate 140 projects from the main body 110 (as shown in FIG. 5), the first elastic element 291 is at a free situation. When the first plate 141 and the second plate 142 are at a parallel situation, the first elastic element 291 deforms and stores the elastic potential energy. In addition, when the first plate 141 and the second plate 142 are at a parallel situation, the first block plate 140 may be engaged within the first recess 110r1, and accordingly the first block plate 140 may be prevented from jumping due to the elastic potential energy being released. As a result, the elastic potential energy may be released to make the first block plate jump to project from the main body 110 only if the engaging connection between the first block plate 140 and the first recess 110r1 is lifted by applying exterior force intentionally.

In the present embodiment, the first block plate 140 is pivotally connected to the main body 110 by the first plate 141. In another embodiment, the first plate 140 may be pivotally connected to the main body 110 by the second plate 141 thereof. In addition, the connection relationship between the second elastic element 292 and the second block plate 150 may be similar to that of the first elastic element 291 and the first block plate 140, and the similarities are not repeated here.

Figure 6:
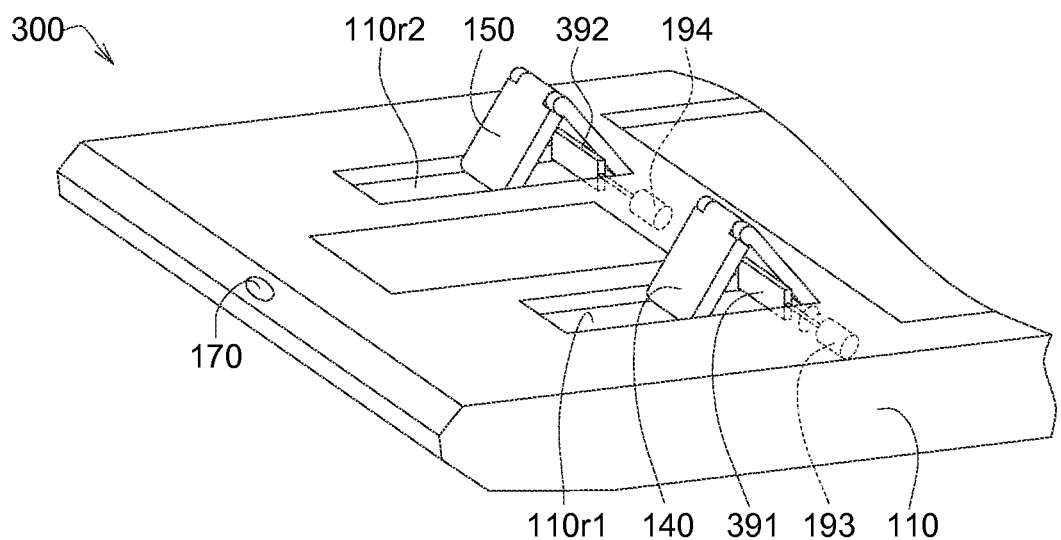
FIG. 6 is an enlargement diagram of a local portion of the electronic device according to another embodiment of the disclosure.

FIG. 6 is an enlargement diagram of a local portion of the electronic device according to another embodiment of the disclosure. The electronic device 300 includes the main body 110, the display screen 120 (not shown), the keyboard 130 (not shown), the first block plate 140, the second block plate 150, the first image capturing unit 160 (not shown), the second image capturing unit 170, the image analysis unit 180 (not shown), the control unit 190 (not shown), the first driver 191 (not shown), the second driver 192 (not shown), the third driver 193, the fourth driver 194, a first jacking plate 391 and a second jacking plate 392.

The first jacking plate 391 is located within the first recess 110r1 and connects to the third driver 193. The third driver 193 may drive the first jacking plate 391 to rotate, such that the first jacking plate 391 jacks the first plate 141 or the second plate 142 of the first block plate 140 to make the first block plate 140 project from the main body 110. In the present embodiment, the first block plate 140 is pivotally connected to the main body 110 by the first plate 141 thereof. In another embodiment, the first block plate 140 is pivotally connected to the main body 110 by the second plate 142 thereof.

In addition, the relationship between the second jacking plate 392 and the fourth driver 194 is similar to that between the first jacking plate 391 and the third driver 193, and the similarities are not repeated here. The relationship between the second jacking plate 392 and the main body 110 is similar to that between the first jacking plate 391 and the main body 110, and the similarities are not repeated here.

Figure 7:
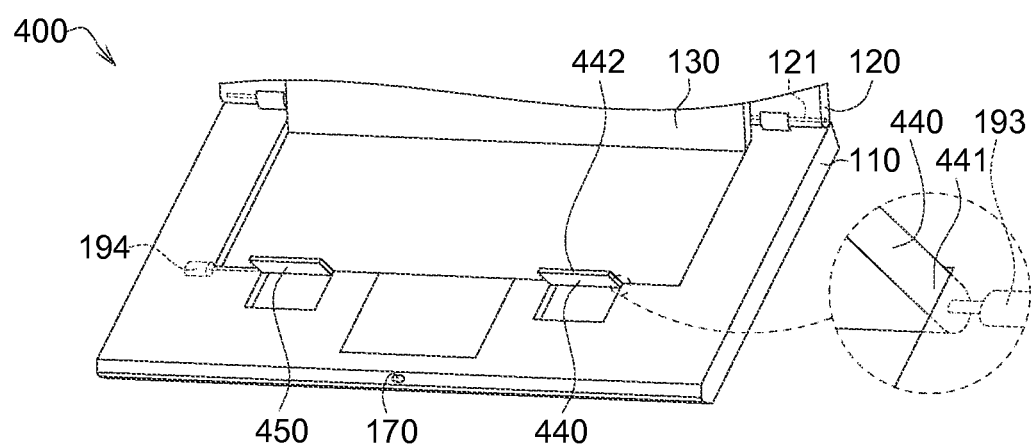
FIG. 7 is an enlargement diagram of a local portion of the electronic device according to another embodiment of the disclosure.

FIG. 7 is an enlargement diagram of a local portion of the electronic device according to another embodiment of the disclosure. The electronic device 400 includes the main body 110, the display screen 120, the keyboard 130, a first block plate 440, a second block plate 450, the first image capturing unit 160 (not shown), the second image capturing unit 170, the image analysis unit 180 (not shown), the control unit 190 (not shown), the first driver 191 (not shown), the second driver 192 (not shown), the third driver 193 and the fourth driver 194.

Compared with the first block plate 140 as mentioned above, the first block plate 440 may omit the first plate 141 or the second plate 142. That is, the first block plate 440 is single flat plate. The connection of the first block plate 440 and the third driver 193 may be similar to that of the first plate 141 or the second plate 142 of the first block plate 140 and the third driver 193, and the similarities are not repeated here. In addition, the first block plate 440 includes a first end 441 and a second end 442. In the present embodiment, the first block plate 440 is pivotally connected to the main body 110 by the first end 441 thereof. In another embodiment, the first block plate 440 is pivotally connected to the main body 110 by the second end 442 thereof.

In addition, in terms of the second block plate 450, the structure of the first block plate 450 is similar to that of the first block plate 440, the connection of the second block plate 450 and the fourth driver 194 may be similar to that of the first block plate 440 and the third driver 193 and/or that of the second block plate 450 and the main body 110, and the similarities are not repeated here.

Despite the rotating axis of the block portion (first block plate 140 and 440) of the above embodiment of the invention is exemplified by being disposed parallel to the rotating axis 121 of the display screen 120, but the embodiments of the disclosure are not limited thereto.

Figure 8:
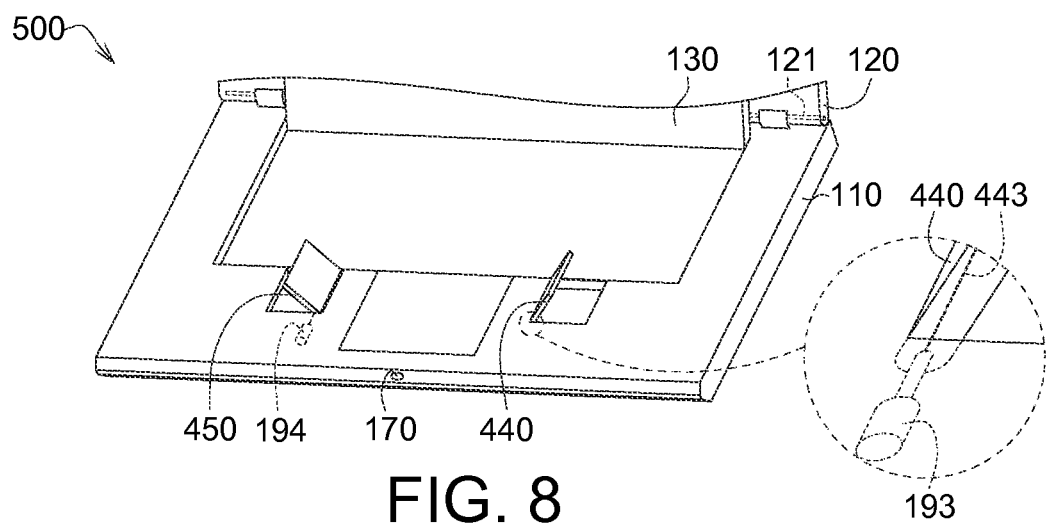
FIG. 8 is an enlargement diagram of a local portion of the electronic device according to another embodiment of the disclosure.

FIG. 8 is an enlargement diagram of a local portion of the electronic device according to another embodiment of the disclosure. The electronic device 500 includes the main body 110, the display screen 120, the keyboard 130, the first block plate 440, the second block plate 450, the first image capturing unit 160 (not shown), the second image capturing unit 170, the image analysis unit 180 (not shown), the control unit 190 (not shown), the first driver 191 (not shown), the second driver 192 (not shown), the third driver 193 and the fourth driver 194. Compared with the above embodiment, the rotating axis 443 of the first block plate 440 of the present embodiment is substantially perpendicular to the rotating axis 121 of the display screen 120. Similarly, the rotating axis of the second block plate 450 of FIG. 9 is substantially perpendicular to or parallel to the rotating axis 121 of the display screen 120.

Figure 9:
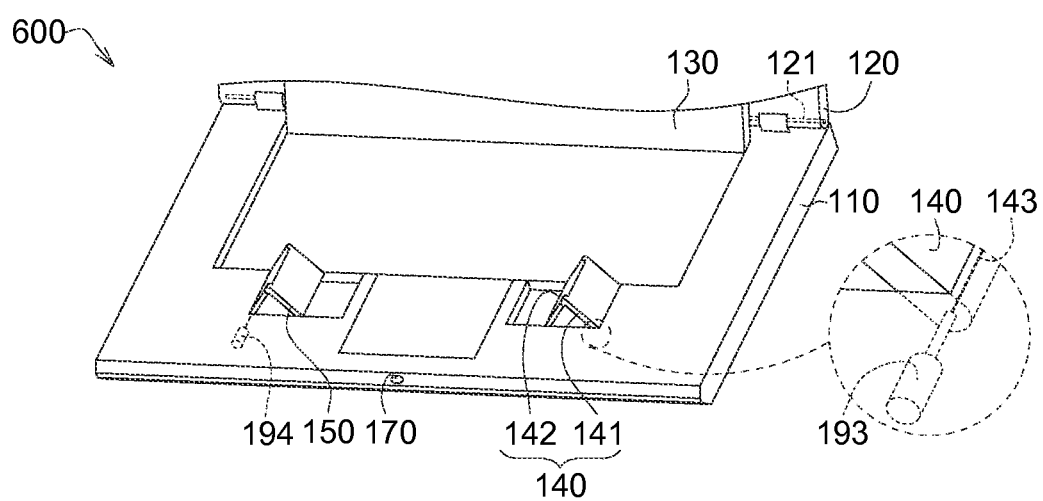
FIG. 9 is an enlargement diagram of a local portion of the electronic device according to another embodiment of the disclosure.

FIG. 9 is an enlargement diagram of a local portion of the electronic device according to another embodiment of the disclosure. The electronic device 600 includes the main body 110, the display screen 120, the keyboard 130, the first block plate 140, the second block plate 150, the first image capturing unit 160 (not shown), the second image capturing unit 170, the image analysis unit 180 (not shown), the control unit 190 (not shown), the first driver 191 (not shown), the second driver 192 (not shown), the third driver 193 and the fourth driver 194. Similarly, the rotating axis 143 of the first block plate 140 of the present embodiment is substantially perpendicular to the rotating axis 121 of the display screen 120. Similarly, the rotating axis of the second block plate 150 is substantially perpendicular to the rotating axis 121 of the display screen 120; however, in another embodiment, the rotating axis of the second block plate 150 may be substantially parallel to the rotating axis 121 of the display screen 120.

In other embodiment, one rotating axis or some rotating axes of several block portions of the electronic device may be substantially perpendicular to the rotating axis 121 of the display screen 120, and the rotating axes of the others of the block portions are substantially parallel to the rotating axis 121 of the display screen 120.

Figure 10A:
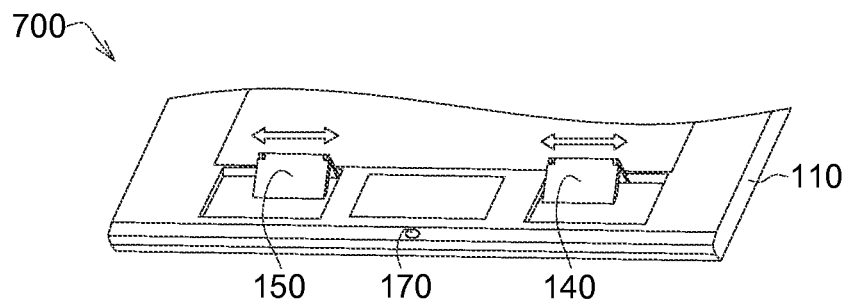
FIG. 10A is an enlargement diagram of a local portion of the electronic device according to another embodiment of the disclosure.
Figure 10B:
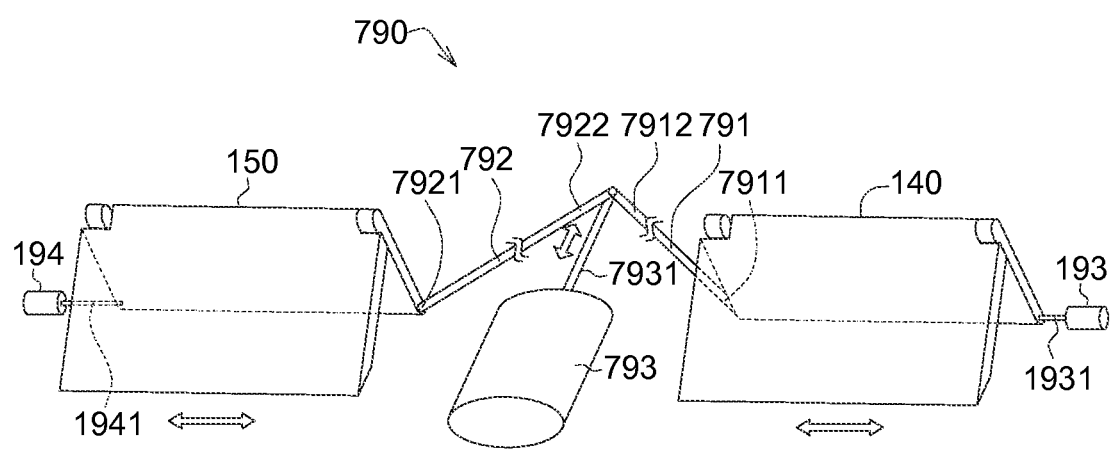
FIG. 10B is a top view of a push mechanism of FIG. 10A.

FIG. 10A is an enlargement diagram of a local portion of the electronic device according to another embodiment of the disclosure, and FIG. 10B is a top view of a push mechanism of FIG. 10A. The electronic device 700 includes the main body 110, the display screen 120 (not shown), the keyboard 130 (not shown), the first block plate 140, the second block plate 150, the first image capturing unit 160 (not shown), the second image capturing unit 170, the image analysis unit 180 (not shown), the control unit 190 (not shown), the first driver 191 (not shown), the second driver 192 (not shown), the third driver 193, the fourth driver 194 and a pushing mechanism 790.

As shown in FIG. 10B, the pushing mechanism 790 may drive the first block plate 140 and the second block plate 150 to move together. The pushing mechanism 790 includes a first bar 791, a second bar 792 and a fifth driver 793. The first bar 791 includes a first end 7911 and a second end 7912, and the second bar 792 includes a third end 7921 and a fourth end 7922. The first end 7911 of the first bar 791 is pivotally connected to the first block plate 140, the second end 7912 of the first bar 791 is pivotally connected to the fourth end 7922 of the second bar 792, and the third end 7921 of the second bar 792 is pivotally connected to the second block plate 150. As a result, when the jacking bar 7931 of the fifth driver 793 stretches, the first block plate 140 and the second block plate 150 move at the same velocity in the directions approaching each other. In contrary, when the jacking bar 7931 of the fifth driver 793 retracts, the first block plate 140 and the second block plate 150 move at the same velocity in the directions away from each other.

In addition, in the present embodiment, the first block plate 140 may slide in a rotating axis 1931 of the third driver 193, and the second block plate 150 may slide in a rotating axis 1941 of the fourth driver 194, such that when the first block plate 140 and the second block plate 150 move relatively, the first block plate 140 and the second block plate 150 may move stably in the axial direction of the rotating axis due to the limitation of the rotating axis 1931 and the rotating axis 1941.

In the present embodiment, the fifth driver 793 is located at one side of the first bar 791 and the second bar 792. In another embodiment, the fifth driver 793 may be located at another side of the first bar 791 and the second bar 792.

Figure 11A:
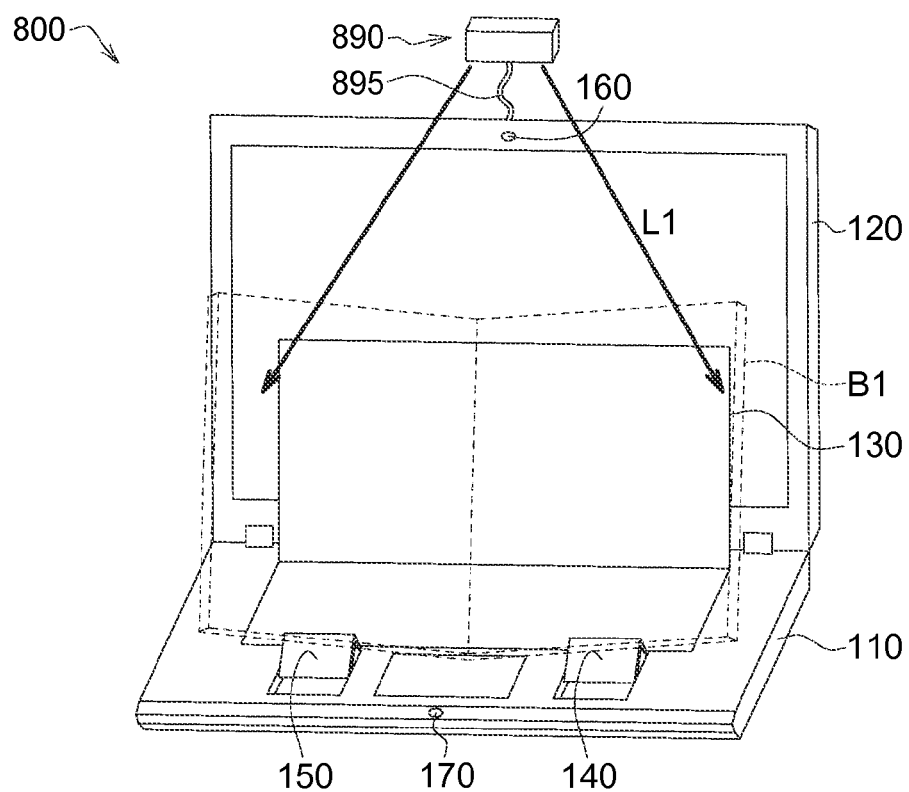
FIG. 11A is an appearance of the electronic device according to another embodiment of the disclosure.
Figure 11B:
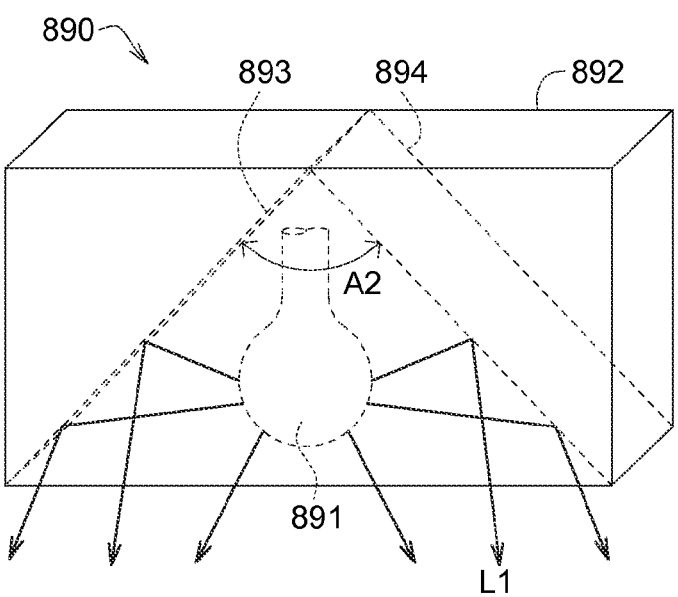
FIG. 11B is a diagram of an illuminating module of FIG. 11A.

FIG. 11A is an appearance of the electronic device according to another embodiment of the disclosure, and FIG. 11B is a diagram of an illuminating module of FIG. 11A. The electronic device 800 includes the main body 110, the display screen 120, the keyboard 130, the first block plate 140, the second block plate 150, the first image capturing unit 160, the second image capturing unit 170, the image analysis unit 180 (not shown), the control unit 190 (not shown), the first driver 191 (not shown), the second driver 192 (not shown), the third driver 193 (not shown), the fourth driver 194 (not shown), an illuminating module 890 and a connecting element 895.

The connecting element 895 connects to the illuminating module 890. The illuminating module 890 connects to the display screen 120 through the connecting element 895. As shown in FIG. 11B, the illuminating module 890 includes an illuminating element 891, a lampshade 892, a first reflector 893 and a second reflector 894. The illuminating element 891 is used for emitting light L1 to illuminate the book B1 (the book B1 is shown in FIG. 11A). The lampshade 892 covers the illuminating element 891, the first reflector 893 and the second reflector 894. The control unit 190 is used for controlling the illuminating module 890 to rotate with respect to the display screen 120. In one embodiment, the control unit 190 may control the connecting element 895 to move to change the position of the illuminating module 890 with respect to the book B1. In addition, the first reflector 893 and the second reflector 894 are pivotally connected to each other, and the control unit 190 may control an angle A2 included between the first reflector 893 and the second reflector 894 according to the viewing angle A1 for adjusting the illuminating scope to make the reader obtain better illuminating.

Figure 12:
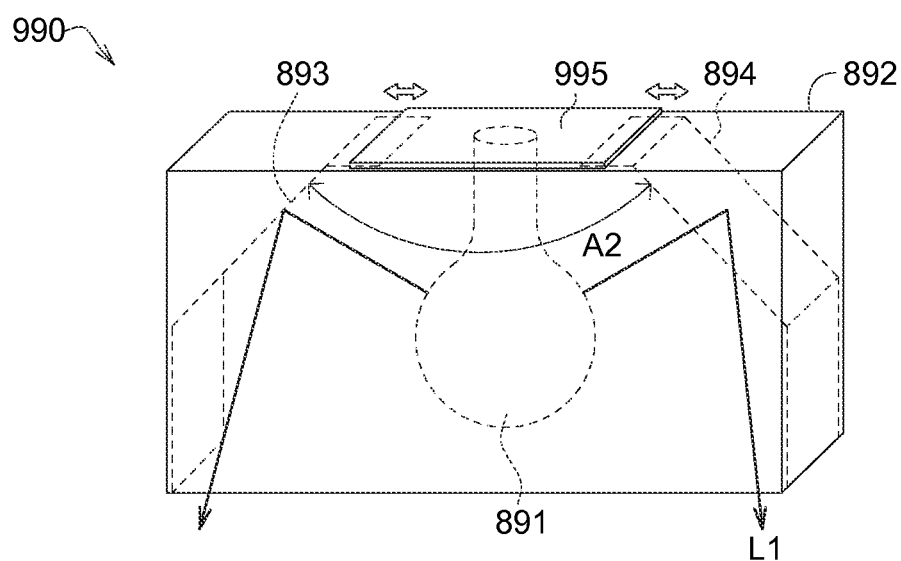
FIG. 12 is a diagram of the illuminating module according to another embodiment of the disclosure.

FIG. 12 is a diagram of the illuminating module according to another embodiment of the disclosure. The illuminating module 990 includes the illuminating element 891, the lampshade 892, the first reflector 893, the second reflector 894 and a third reflector 995. In the present embodiment, the illuminating element 891 may be disposed above the third reflector 995. In additional to the angle A2 included between the first reflector 893 and the second reflector 894 may be adjusted, the first reflector 893 and the second reflector 894 may move straight with respect to the third reflector 995 for adjusting the illuminating scope to make the reader obtain better illuminating.

Figure 13A:
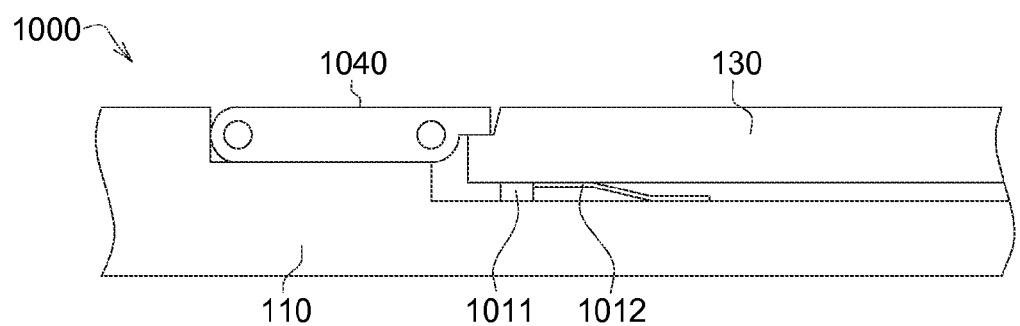
FIGS. 13A to 13C are processes of the electronic device being transformed into the bookshelf.
Figure 13B:
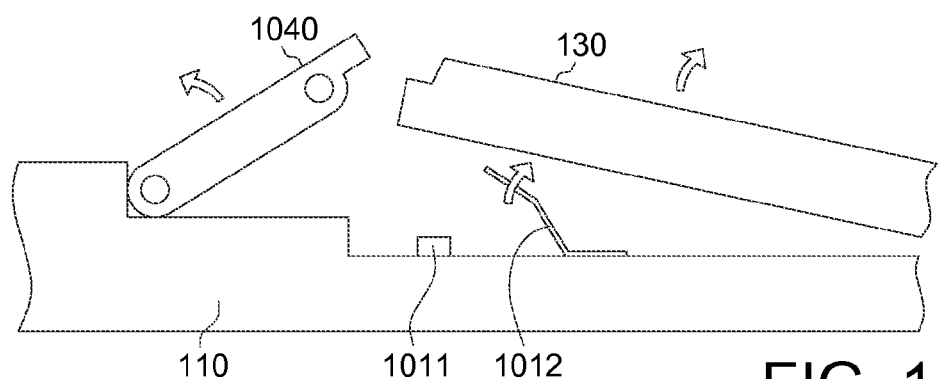
Figure 13C:
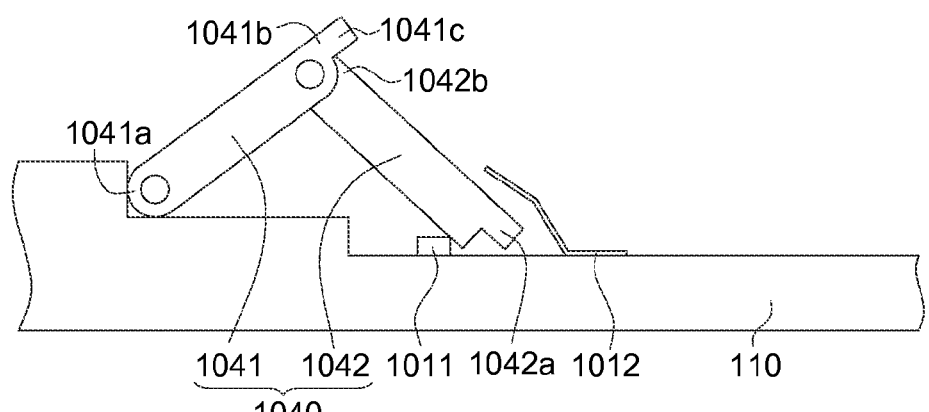

FIGS. 13A to 13C are processes of the electronic device being transformed into the bookshelf. The electronic device 1000 includes the main body 110, the display screen 120 (not shown), the keyboard 130, the first block plate 1040, the second block plate 1050 (not shown), the first image capturing unit 160 (not shown), the second image capturing unit 170 (not shown), the image analysis unit 180 (not shown), the control unit 190 (not shown), the first driver 191 (not shown), a block portion 1011 and an elastic element 1012.

As shown in FIG. 13A, the first block plate 1040 presses against the keyboard 130 for preventing the keyboard 130 from being jumping. Under the state, the elastic element 1012 deforms to store the elastic energy. In the present embodiment, the elastic element 1012 is, for example, an elastic piece or a spring.

As shown in FIG. 13B, after the first block plate 1040 is released, the elastic element 1012 releases the elastic energy to drive the keyboard 130 to jump and then be close to the display screen 120 (not shown).

As shown in FIG. 13C, the first block plate 1040 includes a first plate 1041 and a second plate 1042. The first plate 1041 includes a first end 1041a and a second end 1042b, and the second plate 1042 includes a first end 1042a and a second end 1042b, wherein the first end 1041a of the first plate 1041 is pivotally connected to the main body 110, the second end 1041b of the first plate 1041 is pivotally connected to the second end 1042b of the second plate 1042, and the first end 1042a of the second plate 1042 is a free end. The second end 1041b of the first plate 1041 has a pressing portion 1041c which may press against the keyboard 130, as shown in FIG. 13A. In addition, as shown in FIG. 13C, the second plate 1042 may rotate with respect to the first plate 1041, and the first end 1042a of the second plate 1042 may be blocked by the block portion 1011. When the book B1 (not shown) leans against the second plate 1042, the angle included between the second plate 1042 and the first plate 1041 may be easily changed due to the first end 1042a of the second plate 1042 being blocked by the block portion 1011. As a result, the position of the book B1 is stable.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An electronic device, comprising:
   a main body;
   a display screen, pivotally connected to the main body;
   a first block plate, pivotally connected to the main body for making a book lean against between the first block plate and the display screen;
   a first image capturing unit, disposed on the display screen for capturing a book image of the book and a first eye image of an eye;
   a second image capturing unit, disposed on the main body for capturing a second eye image of the eye;
   an image analysis unit, used for determining a relative distance between the eye and the main body according to the first eye image and the second eye image and a book size of the book according to the book image; and
   a control unit, used for determining a suitable viewing angle according to the relative distance and the book size and controlling the display screen to rotate, such that a viewing angle at the book viewed by the eye is substantially equal to the suitable viewing angle.

2. The electronic device according to claim 1, wherein the control unit is used for controlling the first block plate to rotate for driving the first block plate to project from the main body.

3. The electronic device according to claim 1, wherein the first block plate comprises:
   a first plate; and
   a second plate;
   wherein one of the first plate and the second plate is pivotally connected to the main body, and the control unit is used for controlling another of the first plate and the second plate to rotate for driving the first block plate to project from the main body.

4. The electronic device according to claim 1, wherein a rotating axis of the display screen is substantially parallel to a rotating axis of the first block plate.

5. The electronic device according to claim 1, wherein a rotating axis of the display screen is substantially perpendicular to a rotating axis of the first block plate.

6. The electronic device according to claim 1, further comprising:
   a second block plate, pivotally connected to the main body and being movable with respect to the first block plate.

7. The electronic device according to claim 6, wherein the further comprising:
   a pushing mechanism, comprising:
      a first bar, comprising a first end and a second end, wherein the first end is pivotally connected to the first block plate;
      a second bar, comprising a third end and a fourth end, wherein the third end is pivotally connected to the second block plate, and the fourth end of the second bar is pivotally connected to the second end of the first bar; and
      a driver, used for driving the first bar and the second bar to move together.

8. The electronic device according to claim 1, further comprising:
   an elastic element, connecting the first block and the main body.

9. The electronic device according to claim 1, further comprising:
   a jacking plate, disposed between the first block plate and the main body and used for jacking the first block plate to project from the main body.

10. The electronic device according to claim 1, further comprising:
    a keyboard, pivotally connected to the main body;
    wherein the control unit is used for controlling the keyboard to rotate until the keyboard is close to the display screen.

11. The electronic device according to claim 1, further comprising:
    an illuminating module, connected to the display screen and comprising:
       an illuminating element, used for emitting light;
       a first reflector, used for reflecting the light; and
       a second reflector, pivotally connected to the first reflector and used for reflecting the light;
    wherein the control unit is used for controlling an angle included between the first reflector and the second reflector for adjusting an illuminating scope of the light.

12. The electronic device according to claim 11, wherein the illuminating module further comprises:
    a third reflector;
    wherein the illuminating element is disposed on the third reflector, and the first reflector and the second reflector are configured to be movable with respect to the third reflector.

13. A method of an electronic device being transformed into a bookshelf, comprising:
    providing an electronic device, wherein the electronic device includes a main body, a display screen, a first block plate, a first image capturing unit, a second image capturing unit, an image analysis unit and a control unit;
    capturing, by the first image capturing unit, a book image of a book and a first eye image of an eye;

capturing, by the second image capturing unit, a second eye image of the eye;

determining, by the image analysis unit, a relative distance between the eye and the electronic device according to the first eye image and the second eye image;

determining, by the image analysis unit, a book size of the book according to the book image;

determining, by the control unit, a suitable viewing angle according to the relative distance and the book size; and controlling, by the control unit, the display screen to rotate, such that a viewing angle at the book viewed by the eye is substantially equal to the suitable viewing angle.

14. The method according to claim 13, further comprising:

controlling, by the control unit, the first block plate to rotate for driving the first block plate to project from the main body.

15. The method according to claim 14, wherein the electronic device further includes a second block plate pivotally connected to the main body, and the method further comprises:

controlling, by the control unit, the second block plate to rotate for driving the second block plate to project from the main body.

16. The method according to claim 15, further comprising:

controlling, by the control unit, the first block plate and the second block plate to move together.

17. The method according to claim 13, wherein the electronic device further includes an illuminating module connecting to the display screen, and the method further comprises:

controlling, by the control unit, the illuminating module to adjust an illuminating scope.

18. The method according to claim 13, wherein the electronic device further includes a keyboard pivotally connected to the main body, and the method further comprises:

controlling, by the control unit, the keyboard to rotate until the keyboard is close to the display screen.

\* \* \* \* \*